United States Patent
Checko

(10) Patent No.: US 10,231,256 B2
(45) Date of Patent: Mar. 12, 2019

(54) METHOD FOR RADIO SOURCE SCHEDULING

(71) Applicant: Microelectronics Technology Inc., Hsinchu (TW)

(72) Inventor: Aleksandra Checko, Copenhagen (DK)

(73) Assignee: Microelectronics Technology Inc., Hsinchu (TW)

( * ) Notice: Subject to any disclaimer, the term of this patent is extended or adjusted under 35 U.S.C. 154(b) by 87 days.

(21) Appl. No.: 15/428,317

(22) Filed: Feb. 9, 2017

(65) Prior Publication Data

US 2017/0238335 A1    Aug. 17, 2017

Related U.S. Application Data

(60) Provisional application No. 62/294,957, filed on Feb. 12, 2016.

(51) Int. Cl.
*H04W 72/12*    (2009.01)
*H04L 12/26*    (2006.01)
(Continued)

(52) U.S. Cl.
CPC ..... *H04W 72/1273* (2013.01); *H04L 43/0852* (2013.01); *H04L 43/106* (2013.01);
(Continued)

(58) Field of Classification Search
CPC ......... H04W 72/1268; H04W 72/1273; H04W 76/10; H04W 88/085
See application file for complete search history.

(56) References Cited

U.S. PATENT DOCUMENTS

2012/0155446 A1*  6/2012  Machida ........... H04W 52/0232
                                                        370/338
2012/0157089 A1   6/2012  Yang et al.
(Continued)

FOREIGN PATENT DOCUMENTS

CN    101945464 A    1/2011
CN    102857958 A1   1/2013
(Continued)

OTHER PUBLICATIONS

Wan et al. "A Performance Study of CPRI over Ethernet with IEEE 802.1Qbu and 802.1Qbv Enhancements" Published in: Global Communications Conference (GLOBECOM), 2015 IEEE Date of Conference: Dec. 6-10, 2015 Date Added to IEEE Xplore:  Feb. 25, 2016 (Year: 2016).*
(Continued)

*Primary Examiner* — Gary Mui
(74) *Attorney, Agent, or Firm* — ScienBiziP, P.C.

(57) ABSTRACT

A method for radio source scheduling implemented in a communication network, the method comprising steps of establishing a connection between a baseband unit (BBU) and at least one transceiving device; transmitting, by the BBU, a plurality of downlink packets according to a downlink scheduling of the BBU; arranging each of the downlink packets to a plurality of transceiving devices; receiving, by the transceiving devices, the downlink packets and transmitting, by the transceiving devices, a plurality of uplink packets; and receiving the uplink packets, by the BBU, according to the downlink scheduling of the BBU.

7 Claims, 9 Drawing Sheets

(51) Int. Cl.
    *H04W 76/10*    (2018.01)
    *H04W 88/08*    (2009.01)
(52) U.S. Cl.
    CPC .......... *H04L 43/50* (2013.01); *H04W 76/10* (2018.02); *H04W 72/1268* (2013.01); *H04W 88/085* (2013.01)

(56) References Cited

U.S. PATENT DOCUMENTS

| | | | |
|---|---|---|---|
| 2013/0100907 A1* | 4/2013 | Liu | H04L 5/0023 370/329 |
| 2013/0114425 A1 | 5/2013 | Sayana et al. | |
| 2013/0301500 A1* | 11/2013 | Koc | H04W 4/90 370/311 |
| 2014/0023035 A1 | 1/2014 | Zou et al. | |
| 2014/0031049 A1 | 1/2014 | Sundaresan et al. | |
| 2015/0229397 A1* | 8/2015 | Shibata | H04B 10/25754 398/115 |
| 2015/0350931 A1 | 12/2015 | Dillinger et al. | |
| 2016/0316396 A1* | 10/2016 | Yu | H04W 28/16 |
| 2017/0272975 A1* | 9/2017 | Uchino | H04W 28/04 |
| 2017/0373890 A1* | 12/2017 | Fertonani | H04L 27/0002 |
| 2018/0007736 A1* | 1/2018 | Ruttik | H04W 88/08 |
| 2018/0063847 A1* | 3/2018 | Huang | H04W 72/0493 |
| 2018/0070373 A1* | 3/2018 | Muench | H04W 72/1252 |
| 2018/0076914 A1* | 3/2018 | Zhou | H04J 3/0667 |
| 2018/0084567 A1* | 3/2018 | Rost | H04W 72/1205 |

FOREIGN PATENT DOCUMENTS

| | | |
|---|---|---|
| CN | 103843437 A1 | 6/2014 |
| TW | 201206219 A1 | 2/2012 |

OTHER PUBLICATIONS

Chang et al. "Impact of Packetization and Functional Split on C-RAN Fronthaul Performance" Published in: Communications (ICC), 2016 IEEE International Conference on, Date of Conference: May 22-27, 2016 Date Added to IEEE Xplore: Jul. 14, 2016 Electronic ISSN: 1938-1883 (Year: 2016).*

* cited by examiner

METHOD FOR RADIO SOURCE SCHEDULING

CROSS REFERENCE

This application claims the benefit of U.S. Provisional Application Ser. No. 62/294,957, filed on Feb. 12, 2016, and entitled "METHOD FOR RADIO SOURCE SCHEDULING", which is incorporated herein by reference in its entirety.

TECHNICAL FIELD

The present disclosure is generally related to a wireless communication method, and particularly to a wireless communication method including source scheduling.

BACKGROUND

In a cloud-RAN (C-RAN) architecture, data transmission between remote radio heads (RRHs) and a baseband unit (BBU) pool is performed by a fronthaul network architecture using a common public radio interface (CPRI) protocol, which includes either a fiber-based network architecture, or an air interface, e.g. radio frequency. This protocol transmits data at a constant bit rate, which means that the data rate is independent of user traffic. That is, the required throughput of CPRI is scaled to cell configurations such as number of antennas or bandwidth of carriers, rather than with user traffic.

Although this new fiber-based network architecture offers numerous benefits to network operators (MNOs), it also gives rise to a new set of challenges; for example, queuing delays.

Moreover, jitter is also an unwanted phenomenon arising from queuing delay. Jitter increases exponentially for high-loaded networks.

BRIEF DESCRIPTION OF THE DRAWINGS

Aspects of the exemplary disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
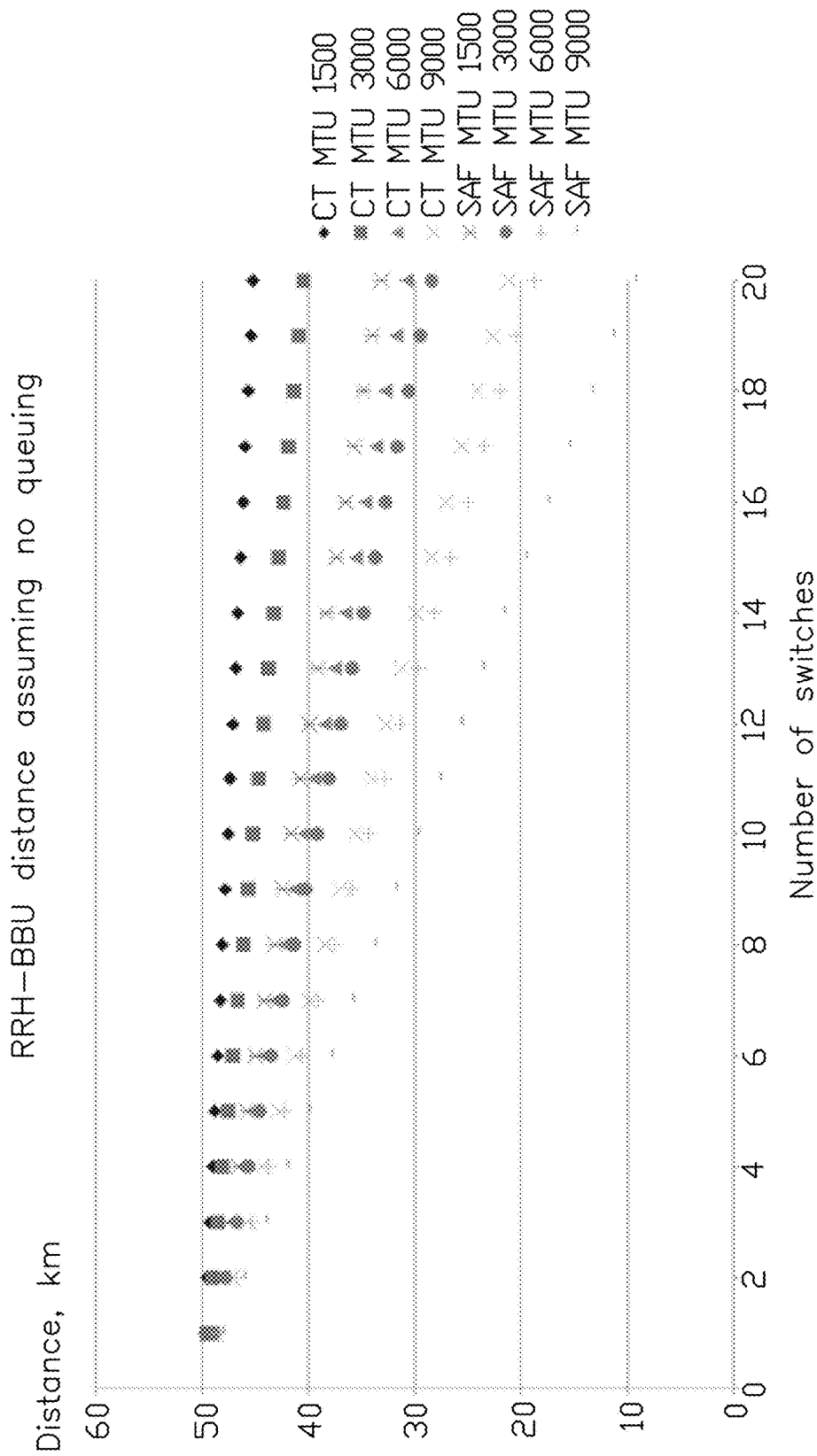
FIG. 1 shows a diagram of switches and distances of various network configurations without queuing.

The present disclosure provides many different embodiments, or examples, for implementing different features of the provided subject matter. Specific examples of components and arrangements are described below to simplify the exemplary disclosure. These are, of course, merely examples and are not intended to be limiting. For example, the formation of the first feature over or on a second feature in the description that follows may include embodiments in which the first and second features are in direct contact, and may also include embodiments in which additional features may be formed between the first and second features, such that the first and second features may not be in direct contact. In addition, the exemplary disclosure may repeat reference numerals and/or letters in the various examples. Such repetition is for the purpose of simplicity and clarity and does not in itself dictate a relationship between the various embodiments and/or configurations discussed.

For consistency of purpose and ease of understanding, like features are identified (although, in some instances, not shown) by numerals in the exemplary figures. However, the features in different embodiments may differ in other respects, and thus shall not be narrowly confined to what is shown in the FIGs.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Common public radio interface (CPRI) protocol transmits data at a constant bit rate and is independent of user traffic. To achieve more efficient data transmission, research on the functional split between baseband unit (BBU) and remote radio head (RRH) is being carried out. An effective way of transporting fronthaul streams is to reuse existing packet-based networks, e.g. Ethernet, and share them between many fronthaul streams and possibly with other services.

Both CPRI and a new function-splitting scheme require that the fronthaul delay be within 250 μs. This fronthaul delay may be on account of the following items including: (1) propagation delay; (2) switching delay; (3) transmission delay; and (4) queuing delay. The propagation delay can be viewed as a constant delay, a natural phenomenon, and constantly consumes about 5 μs per kilometer of fiber. As for the switching delay, two sorts of switches are discussed herein including: (a) a store-and-forward (SAF) switch; and (b) a cut through (CT) switch. For the SAF switch, a delay would have magnitude of microseconds, for example, 3 μs. As for the CT switches, the delay would be shorter than that of SAF switch, in practice on the order of nanoseconds.

The transmission delay can also be considered deterministic. The transmission delay depends on how big is the packet size and the speed of the link. For example, a 10 Gbps Ethernet link 1500 maximum transmission unit (MTU) would have a delay of 1.2 μs per switch; on 1 Gbps link, 12 μs of delay would be expected. With respect to queuing delay, regarded as a non-deterministic, this would be the main target to fight with since it depends on the loading of the network, e.g. 60 μs for 60% of traffic load.

Jitter arises from queuing delay, and would be especially high for high network loads. It can be compensated for by buffering, however, buffering poses an impact on overall delay, and the delay should not be non-deterministic. Next generation fronthaul interface targets at least 6 switches. However, more switches can be exemplary between the RRH and BBU pools. An exemplary budget for 20 km (the RRH and BBU pool), 6 cut-through switches, 1500 B MTU, and 10 Gbps links would be described as follows:

100 μs (20 km×5 μs/km)+ns+6 switches×1.2 μs/switch+queueing+buffering=107.2 μs queueing+buffering Such a delay budget will be straightforward to achieve if a fast, modern, and dedicated network is available. However, in case there are SAF switches in the network instead of CT switches, and only 1 Gbps capacity is available, this budget shrinks as follows:

100+6×12+queueing+buffering=172 μs+queueing+buffering

For cost optimization, such a link is supposed to be shared by many fronthaul and possibly other services, the remaining 78 μs may not be enough for queuing and buffering.

FIG. 1 shows a diagram of switches and distances of various network configurations without queuing. FIG. 1 is illustrating an allowed distance between RRH and BBU for total delay budget of 250 μs, depending on the number of switches in the network, maximum transmission unit (MTU) size and type of switch (store and forward (SAF) and cut through (CT)), when no queuing is exemplary in the network. As shown in FIG. 1, the allowed distance between RRH and BBU for total delay budget of 250 μs is varied in response to the number of switches in the network.

Figure 2:
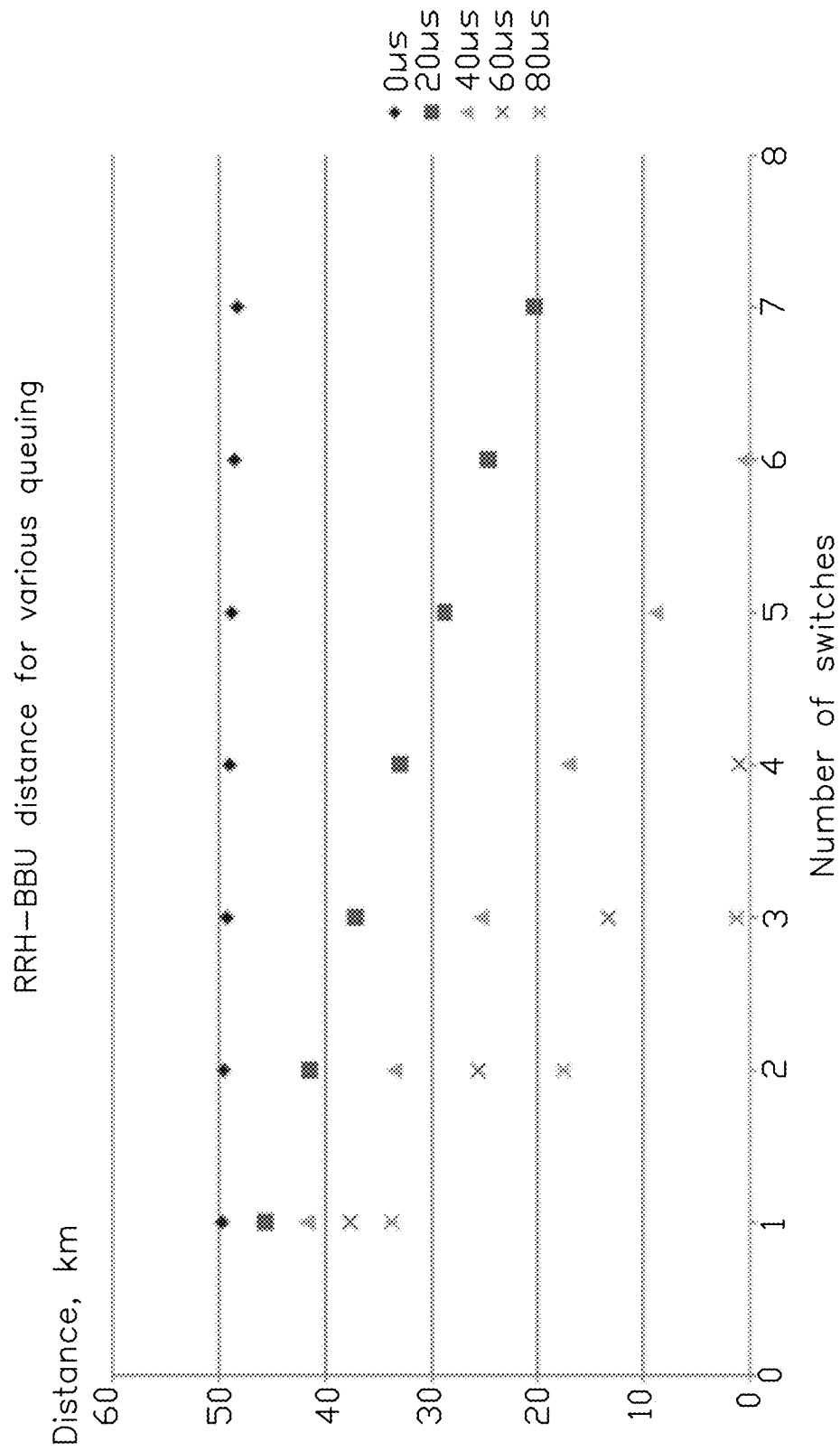
FIG. 2 shows a diagram of switches and distances of various network configurations with queuing.

FIG. 2 shows a diagram of switches and distances of various network configurations with queuing. FIG. 2 is illustrating an allowed distance between RRH and BBU for total delay budget of 250 μs, depending on the number of switches in the network and queuing delay per switch, CT switch, MTU 1500. As shown in FIG. 2, the allowed distance between RRH and BBU pool is reduced considerably. The allowed distance between RRH and BBU for total delay budget of 250 μs is varied in response to the number of switches in the network. As shown in FIG. 2, the required 6 switches cannot be supported for a limit of 40 μs in a queuing delay.

Figure 3A:
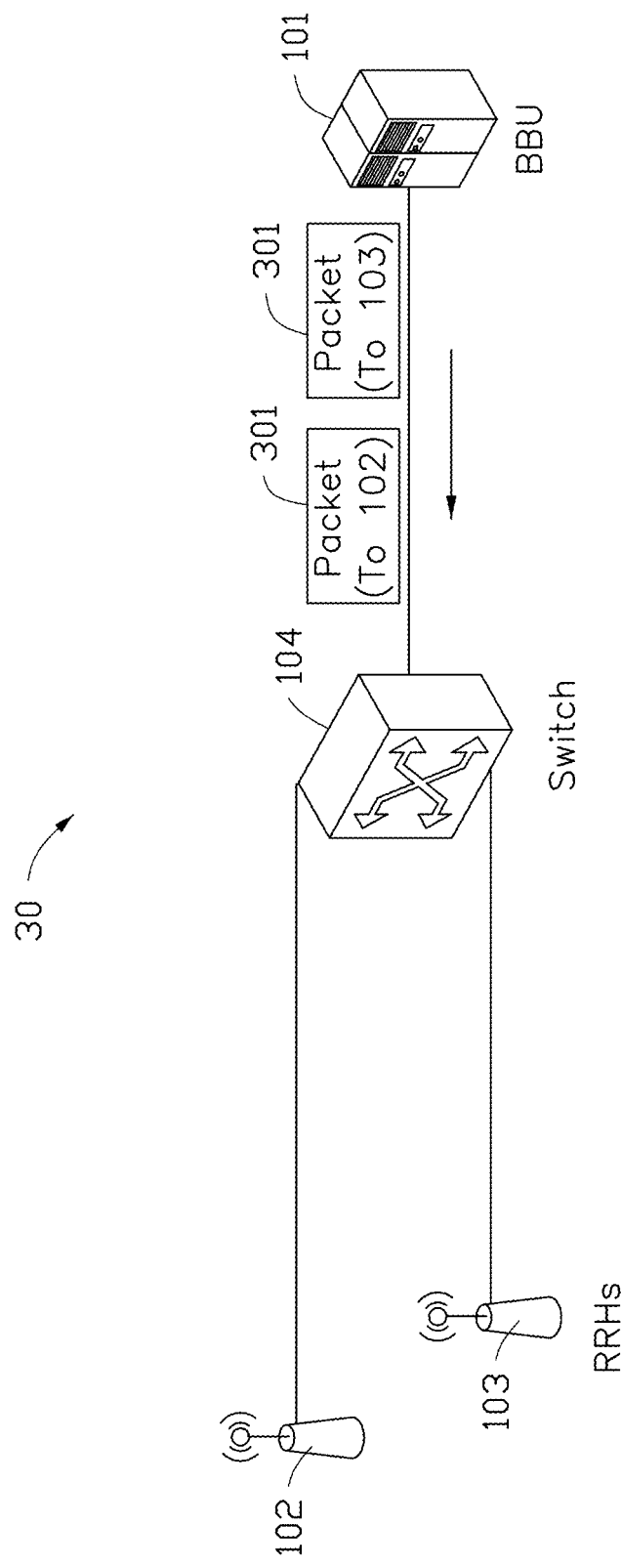
FIG. 3A to FIG. 3D show a schematic diagram of testing packets transmission of a connection establishment of a communication system of an exemplary embodiment of the present disclosure.

FIG. 3A to FIG. 3D show a schematic diagram of testing packets transmission of a connection establishment of a communication system of an exemplary embodiment of the present disclosure. As shown in FIG. 3A, in this embodiment, the communication system 30 includes a packet arranging module 104 coupled between a base band unit (BBU) 101, and at least two wireless transceiving devices 102, 103. In this embodiment, the packet arranging module 104 includes a switch. The transceiving devices 102, 103 include a Radio Remote Head (RRH). In some embodiments, the packet arranging module 104 includes a packet arranging algorithm.

Before starting data transmission between the BBU 101 and the transceiving devices 102, 103, the connections between the BBU 101 and the transceiving devices 102, 103 are respectively established and a delay time is respectively synchronized between the BBU 101 and the transceiving devices 102, 103.

As shown in FIG. 3A, the BBU 101 respectively transmits out a plurality of testing packets 301 in order to each of the transceiving devices 102, 103 according to a scheduling of the BBU 101, and the BBU 101 notes a first timestamp T1 for the transmitting time of the packet. Preferably, the testing packet is a high priority testing packet, since the delay of the testing packet 301 should be as close as possible to the delay that data transmission will experience later, hence the testing packet 301 should not experience any queuing, and should have higher priority.

Figure 3B:
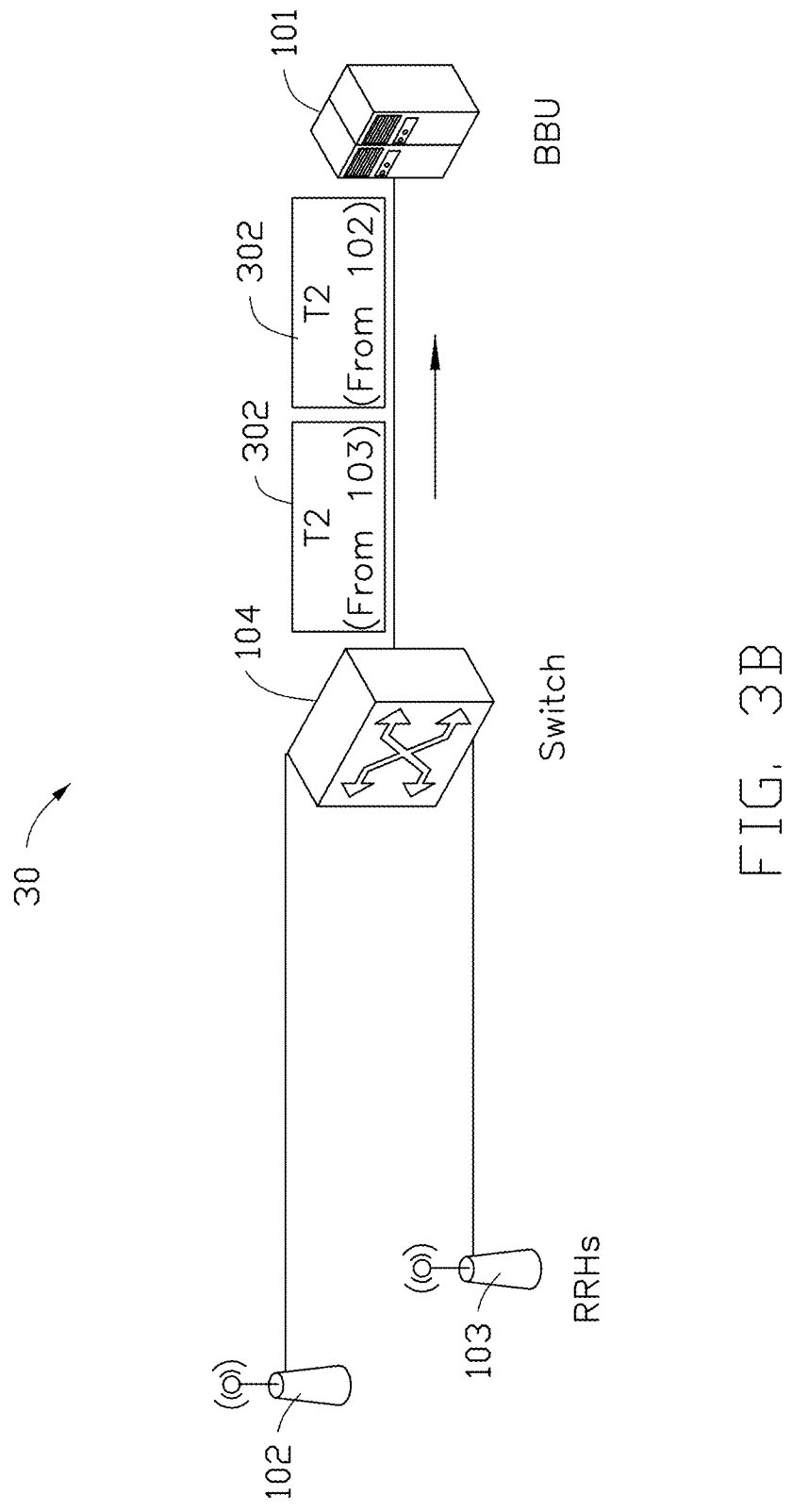

In other embodiments, the first timestamp T1 is encapsulated in a follow-up packet that follows the testing packet. As shown in FIG. 3B, upon the testing packet 301 arriving at the transceiving devices 102, 103, a second timestamp T2 is noted at the transceiving devices 102, 103, as the arrival timing at the transceiving devices 102, 103. Moreover, the second timestamp T2 of each of the transceiving devices 102, 103 is respectively encapsulated into a packet 302 sent to the BBU 101.

Figure 3C:
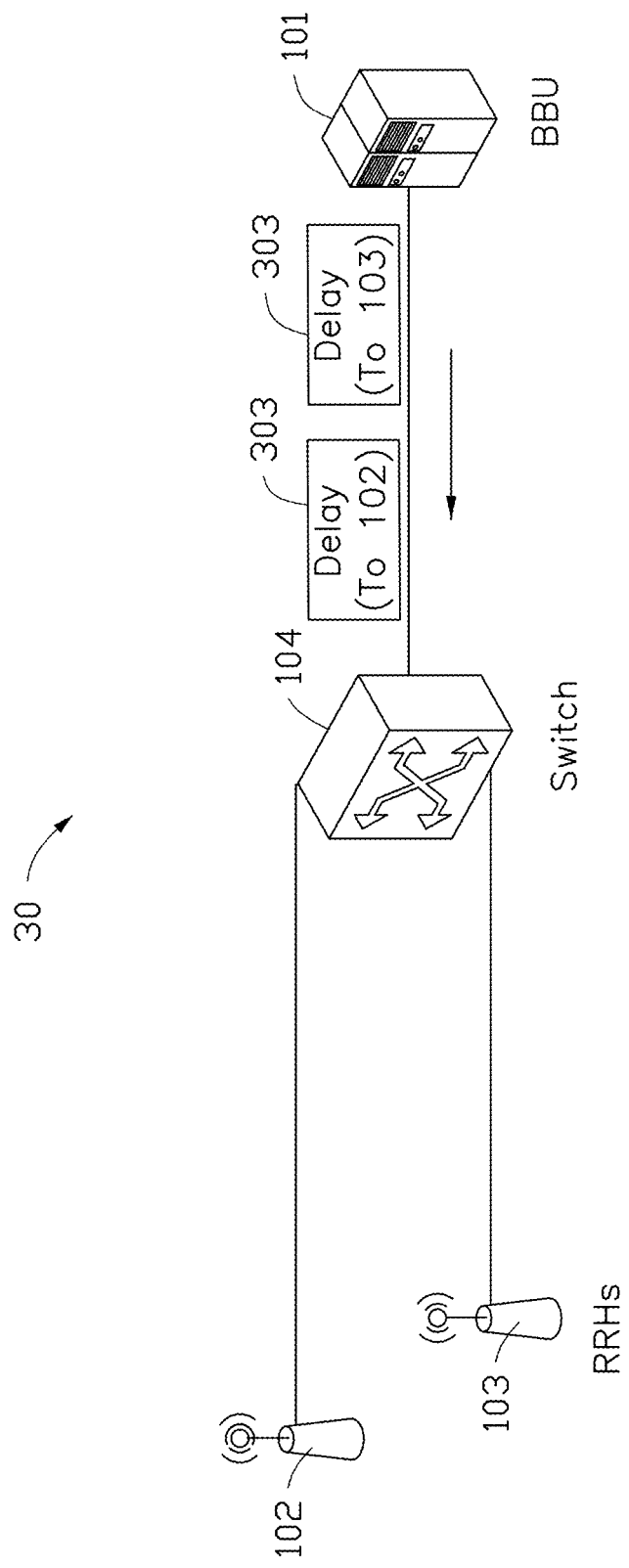
Figure 3D:
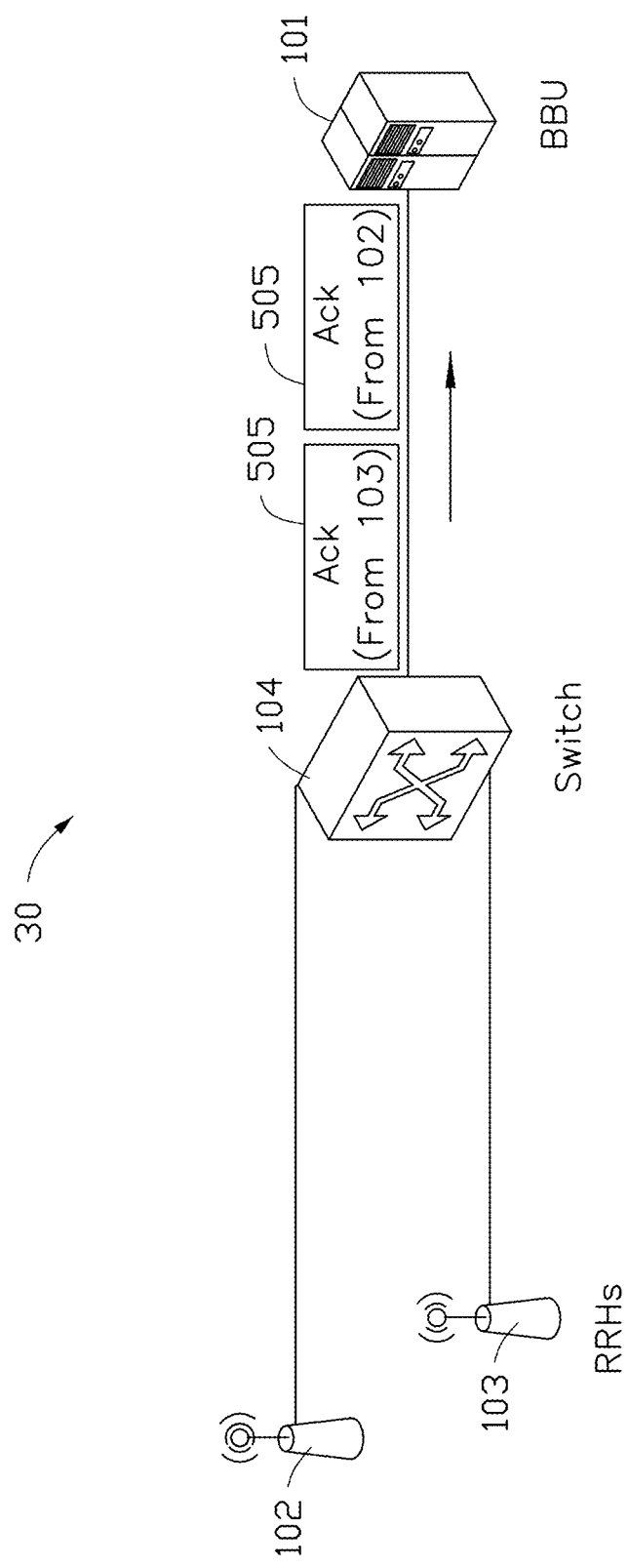

As shown in FIG. 3C, with these two timestamps, the BBU 101 can calculate the transmission delay over the channel, as being the difference between the two timestamps. After the BBU 101 computes the Delay parameter, the BBU transmits a packet 303, including the Delay parameter, to the transceiving devices 102, 103 and the data packet transmission can follow. Upon receiving the Delay parameter, as shown in FIG. 3D, an acknowledgement 505 is generated by each of the transceiving devices 102, 103 and the acknowledgements 505 are arrived at the BBU according to the scheduling of the BBU. The connection between the BBU and the transceiving device is then established.

A transmission delay measurement can thus be expressed as follow:

$$Delay = T2 - T1$$

In some embodiments, with these two timestamps, the transceiving devices 102, 103 can calculate the transmission delay over the channel, as being the difference between the two timestamps. After the transceiving devices 102, 103 compute the Delay parameter, the transceiving devices 102, 103 respectively transmit the Delay parameter and an acknowledgement to the BBU 101 and the data packet transmission can follow. Upon receiving this acknowledgement, the connection between the BBU 101 and the transceiving devices 102, 103 are respectively established.

Figure 4:
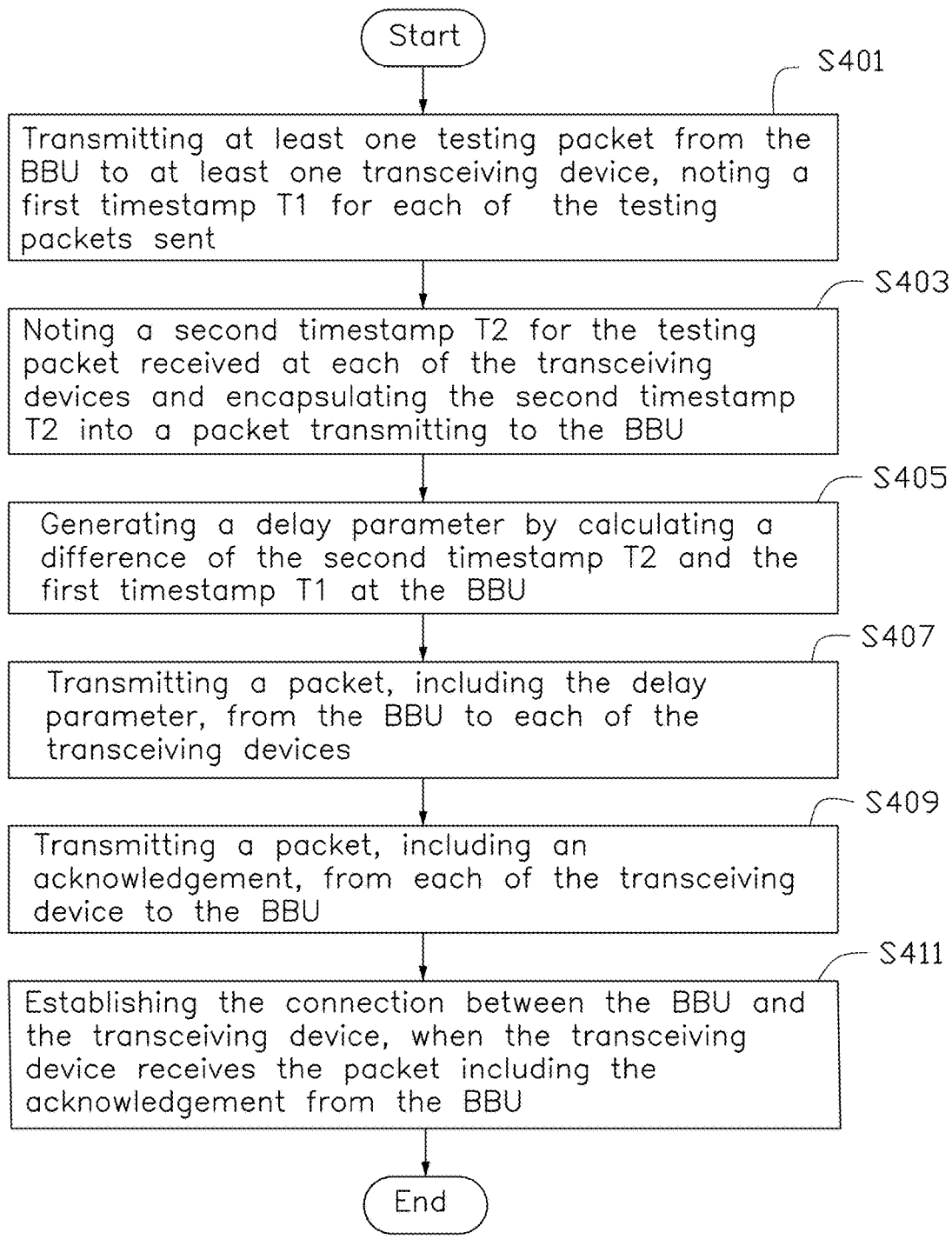
FIG. 4 shows a flow diagram of the connection establishment of FIGS. 3A to 3D of an exemplary embodiment of the present disclosure.

FIG. 4 shows a flow diagram of a connection establishment of FIGS. 3A to 3D of an exemplary embodiment of the present disclosure. As shown in FIG. 4, in step S401, at least one testing packets from the BBU is transmitted to at least one transceiving devices according to a scheduling of the BBU, and a first time stamp T1 is noted by the BBU upon the testing packets being sent. In step S403, upon the testing packet is received at the transceiving device, a second timestamp T2 is noted at the transceiving device and the second timestamp T2 is encapsulated into a packet transmitted to the BBU. In step S405, a delay parameter is generated by calculating a difference of the second timestamp T2 and the first timestamp T1 at the BBU. In step S407, a packet, including the Delay parameter, is transmitted from the BBU to the transceiving device. In step S409, a packet including an acknowledgement is transmitted from each of the transceiving devices to the BBU after the Delay parameter is received at each of the transceiving devices. In step S411, the connection between the BBU and the transceiving device is established when the transceiving devices receives the packet, including the acknowledgement, from the BBU.

Figure 5:
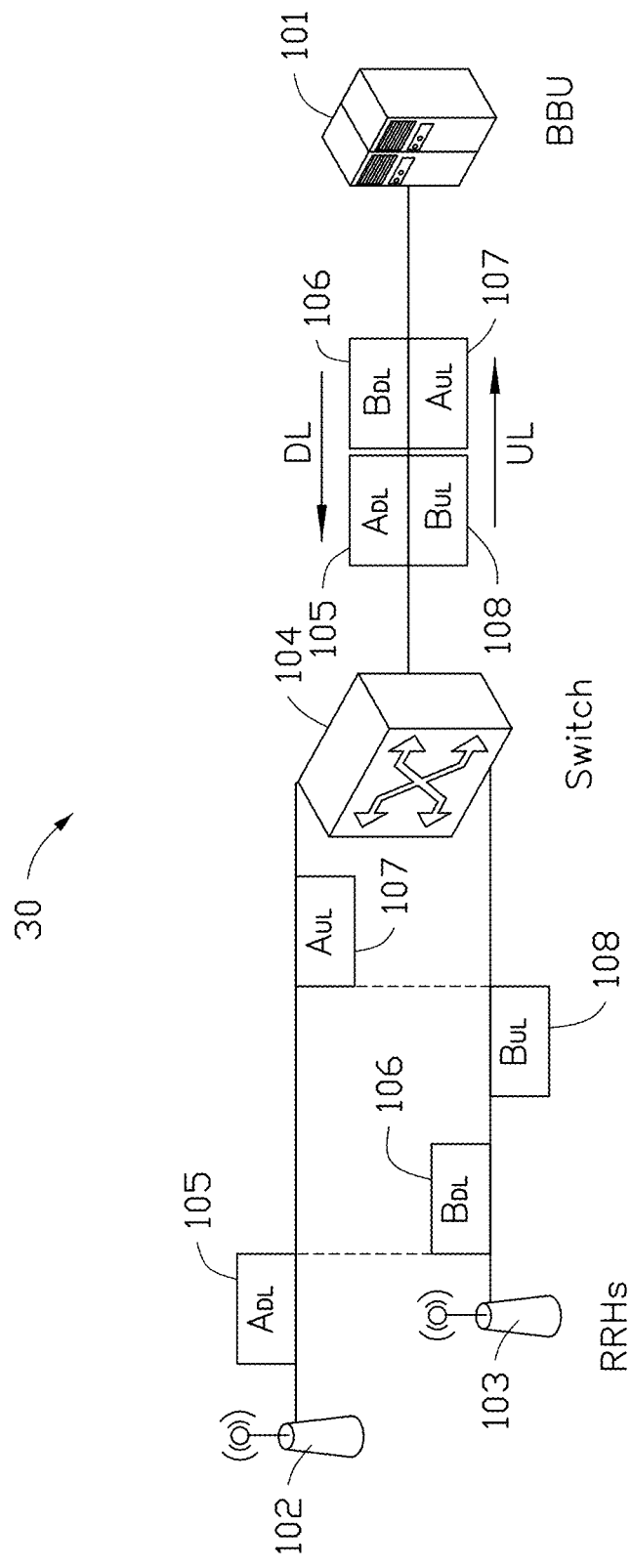
FIG. 5 shows a schematic diagram of a data transmission of a communication system implementing a method for radio source scheduling of an exemplary embodiment of the present disclosure.

FIG. 5 shows a schematic diagram of a data transmission of a communication system implementing a method for radio source scheduling of an exemplary embodiment of the present disclosure. In this embodiment, the connection is established and the Delay parameter is synchronized between the BBU 101 and the transceiving devices 102, 103.

As shown in FIG. 5, in this embodiment, the BBU 101 transmits out two downlink data packets in order, according to a scheduling of the BBU 101. The two downlink data packets are referred to as packet $A_{DL}$ 105 and packet $B_{DL}$ 106. In some embodiments, the scheduling can be a predetermined scheduling procedure, and can be modified or adjusted in accordance with particular conditions to fit the complexities of the transmission channel and communications environment. In this embodiment, the downlink data packets are scheduled "in order", meaning these two downlink data packets are transmitted in two different but successive downlink timeslots.

As shown in FIG. 5, in the same manner as packet $A_{DL}$ 105 and packet $B_{DL}$ 106, BBU 101 transmits two more packets to transceiving devices 102, 103 in order. This particular scheduling algorithm in the exemplary embodiment should not limit the scope of the exemplary disclosure, it should be construed that any kind of scheduling algorithm can be utilized by the BBU 101 for downlink data packets.

The packet arranging module 104 shown in FIG. 5 functions as a data packets manager for arranging the data packets. The packet arranging module 104 shown in FIG. 5 arranges packet $A_{DL}$ 105 to the transceiving device 102 and packet $B_{DL}$ 106 to the transceiving device 103. According to the timeline illustrated in FIG. 5, the transceiving device 102 receives packet $A_{DL}$ 105 in the earlier downlink timeslot, and the transceiving device 103 receives packet $B_{DL}$ 106 in the later downlink timeslot.

Each of the transceiving devices 102, 103 measures the receiving interval between packets. This indicates how long it will take for the arrival of the next downlink data packet. That is, assuming an transceiving device has received two successive packets (packet in and packet m+1) that were transmitted from the BBU 101, and that the transceiving device receives packet in and packet m+1 at respectively different timings Rcx(m) and Rcx(m+1), the transceiving device can measure the packet receiving interval to be Rcx(m+1)−Rcx(m). The packet receiving interval RcxInt can be expressed as follows:

RcxInt=Rcx(*m*+1)−Rcx(*m*)

Each of the transceiving devices 102, 103 transmits uplink data packet at a specific timing in the future, that is also the earliest possible timing after each of the transceiving devices 102, 103 receives its own downlink data packets 105, 106. Specifically, each of the transceiving devices 102, 103 calculates a certain timing by reference to all parameters, that is, transmission delay Delay and a packet receiving interval RcxInt. Assuming a transceiving device receives a downlink data packet at timing DLrcx, the transceiving device would be transmitting an uplink data packet at DLrcx−2Delay+n*RcxInt.

Referring to the future timing DLrcx−2Delay+n*RcxInt, n is a selective number chosen by an algorithm, by that of BBU 101, or by that of transceiving devices 102, 103. To make this future timing to be the earliest future timing, n can also be construed as a number chosen to make the future timing the smallest positive number. That is, the process of number selection should not limit the scope hereof, the process is highly adjustable and adaptive to people with ordinary skill in the art.

FIG. 5 shows an exemplary embodiment of the uplink scheduling which follows the downlink scheduling. After receiving the downlink data packets 105, 106, the transceiving device 102 that receives packet ADL 105 transmits out an uplink data packet referred to as packet AUL 107, the other transceiving device 103 transmits out an uplink data packet referred to as packet BUL 108. Since the transceiving devices 102, 103 receive the downlink data packet 105, 106, one received earlier and another later, packet $A_{UL}$ 107 would be transmitted out first followed by packet $B_{UL}$ 108 (as shown in FIG. 5). Packet $A_{UL}$ 107 and packet $B_{UL}$ 108 are transmitted by different pathways. These two uplink data packets 107, 108 are then transmitted to the BBU 101, in order, depending on the arrangement of the packet arranging module 104. The function of the packet arranging module 104 described above is to arrange packet $A_{UL}$ 107 to be transmitted first and packet $B_{UL}$ 108 second.

By the above processes, the BBU 101 schedules the downlink traffic to all transceiving devices 102, 103. As shown in FIG. 5, the downlink data packets 105, 106 leave from output port of BBU 101 in order, just as packet $A_{DL}$ 105 is the first to be transmitted out followed by packet $B_{UL}$ 106. This order can be mapped to virtual timeslots. For each packet received in the downlink, the transceiving device will transmit out one uplink data packet. Therefore, none of the uplink data packets transmitted from the transceiving devices will collide with each other if transmitted with correct timing, to fit the virtual timeslots prepared in advance for the downlink.

By reusing the scheduling already done by the BBU, selection of the smallest positive number n for the future timing is the only task outstanding. Therefore, neither the transceiving devices 102, 103 nor the entire system needs to implement additional algorithms or devices relative to uplink packet scheduling. A great number of unnecessary computations can be omitted, and queuing delays minimized.

At the RRH boot-up control packets would need to be exchanged to measure delay, similar way in which timing advance is implemented in GSM. This can be done by means of control packets of IEEE 1904.3. Framework given by IEEE 802.1Qbv can also be used.

Figure 6:
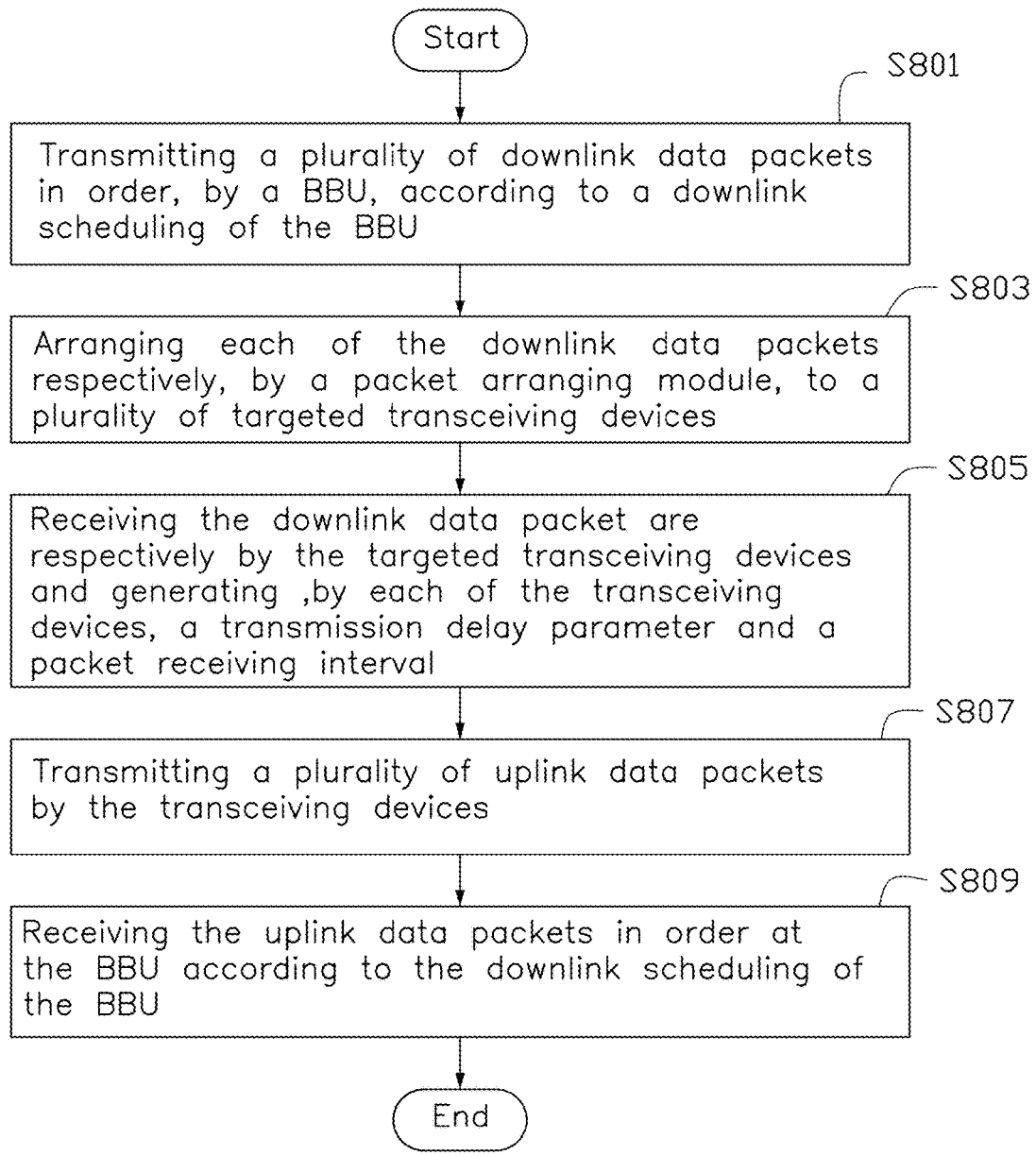
FIG. 6 shows a flow diagram of the data transmission of FIG. 5 of an exemplary embodiment of the present disclosure.

FIG. 6 shows a flow diagram of the data transmission of FIG. 5 of an exemplary embodiment of the present disclosure. As shown in FIG. 6, in step S801, a plurality of downlink data packets is transmitted out in order, by a BBU, according to a downlink scheduling of the BBU. In some embodiments, a transmission order of the packets of the downlink scheduling of the BBU are allocated in consecutive downlink timeslots. In step S803, each of the downlink data packets is respectively arranged, by a packet arranging module, to a plurality of targeted transceiving devices. In step S805, the downlink data packets are respectively received by the targeted transceiving devices, and a transmission delay parameter and a packet receiving interval are then generated.

In this embodiment, a transmission delay parameter and a packet receiving interval are generated by each of the transceiving devices, wherein the transmission delay parameter is generated in response to a time difference of a transmitting time of a downlink packet, from the BBU, and a receiving time of a downlink packet, received by the transceiving device. Moreover, the packet receiving interval is generated in response to a time difference of the receiving time of one downlink packet, received by the transceiving device and receiving a consecutive downlink packet by the transceiving device.

In step S807, a plurality of uplink data packets are transmitted by the transceiving devices. In step S809, the uplink data packets are received in order at the BBU according to the downlink scheduling of the BBU.

The present disclosure provides a method for radio source scheduling. The radio source scheduling method enables transceiving devices (e.g. RRHs) to transmit uplink data packet for each of the received downlink data packets. To be more specific, the scheduling of uplink data packet transmission at RRHs follows the scheduling that has already done by BBU pool, thereby RRHs can reuse the BBU-scheduled downlink scheduling. A huge amount of unnecessary computation involving uplink data packets scheduling can be saved at RRHs by such RRHs' reusing the already-done downlink scheduling, and further minimization of undesired delays can be achieved.

The embodiments shown and described above are only examples. Many details are often found in the art such as the other features of a source scheduling method, and a wireless communication device. Therefore, many such details are neither shown nor described. Even though numerous characteristics and advantages of the exemplary technology have been set forth in the foregoing description, together with details of the structure and function of the exemplary disclosure, the disclosure is illustrative only, and changes may be made in the details, including in matters of shape, size, and arrangement of the parts within the principles of the exemplary disclosure, up to and including the full extent established by the board general meaning of the terms used in the claims. It will therefore be appreciated that the embodiments described above may be modified within the scope of the claims.

The invention claimed is:

1. A method for radio source scheduling implemented in a communication network, the method comprising steps of:
   establishing a connection between a baseband unit (BBU) and at least one transceiving devices, wherein the step of establishing the connection between the BBU and the transceiving devices comprises:
   transmitting, by the BBU, at least one testing packet to each of the transceiving devices according to a scheduling of the BBU, wherein a first timestamp is noted for each of the testing packets sent;
   noting, by each of the transceiving devices, a second timestamp as the receiving time of the testing packet and encapsulating the second timestamp into a first packet sent to the BBU;
   generating, by the BBU, a delay parameter in response to a time difference of the first and the second timestamps; and
   transmitting, by the BBU, a second packet including the delay parameter to each of the transceiving devices; and
   transmitting a third packet including an acknowledgement, by the transceivinig device, to the BBU;
   transmitting, by the BBU, a plurality of downlink packets according to a downlink scheduling of the BBU;
   arranging each of the downlink packets to the transceiving devices;
   receiving, by the transceiving devices, the downlink packets and transmitting, by the transceiving devices, a plurality of uplink packets; and
   receiving the uplink packets, by the BBU, according to the downlink scheduling of the BBU and the delay parameter, wherein the uplink packets are received by the BBU in an order corresponding to a packet transmission order of the downlink scheduling.

2. The method of claim 1, wherein a transmission order of the packets of the downlink scheduling of the BBU are allocated in consecutive downlink timeslots.

3. The method of claim 1, wherein the transceiving device calculates a packet receiving interval, wherein the packet receiving interval is a time difference of a receiving time of one downlink packet and a receiving time of a consecutive downlink packet.

4. The method of claim 1, wherein the transceiving device includes a radio remote head (RRH).

5. A communication network implementing a method for radio source scheduling, comprising:
   a BBU, configured to generate a plurality downlink packets according to a downlink scheduling of the BBU, after establishing a connection of the BBU and a plurality of transceiving devices;
   a switch circuit coupled between the BBU and the transceiving devices, wherein the switch circuit is configured to arrange each of the downlink packets to the transceiving devices;
   wherein the transceiving devices are configured to generate a plurality of uplink packets to the BBU after receiving the downlink packets;
   the BBU is further configured to receive the uplink packets according to the downlink scheduling of the BBU and a delay parameter, and the uplink packets are received by the BBU in an order corresponding to a packet transmission order of the downlink scheduling;
   the BBU is further configured to transmit at least one testing packet to each of the transceiving devices according to a scheduling of the BBU, wherein a first timestamp is noted for each of the testing packets sent;
   each of the transceiving devices is further configured to note a second timestamp as the receiving time of the testing packet and encapsulate the second timestamp into a first packet sent to the BBU;
   the BBU is further configured to generate the delay parameter in response to a time difference of the first and the second timestamps;
   the BBU is further configured to transmit a second packet including the delay parameter to each of the transceiving devices; and
   the transceivinig device is further configure to transmit a third packet including an acknowledgement to the BBU.

6. The communication network of claim 5, wherein the transceiving device includes a radio remote head (RRH).

7. The communication network of claim 5, wherein a transmission order of the packets of the downlink scheduling of the BBU are allocated in consecutive downlink timeslots.

* * * * *